United States Patent
Kato

(10) Patent No.: US 9,977,620 B2
(45) Date of Patent: May 22, 2018

(54) STORAGE DEVICE AND STORAGE SYSTEM

(71) Applicant: FUJITSU LIMITED, Kawasaki-shi, Kanagawa (JP)

(72) Inventor: Jun Kato, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 90 days.

(21) Appl. No.: 14/972,712

(22) Filed: Dec. 17, 2015

(65) Prior Publication Data

US 2016/0224274 A1   Aug. 4, 2016

(30) Foreign Application Priority Data

Feb. 2, 2015   (JP) .................. 2015-018372

(51) Int. Cl.
*G06F 12/08* (2016.01)
*G06F 3/06* (2006.01)
*G06F 12/0893* (2016.01)

(52) U.S. Cl.
CPC .......... *G06F 3/0647* (2013.01); *G06F 3/0604* (2013.01); *G06F 3/067* (2013.01); *G06F 3/0617* (2013.01); *G06F 3/0683* (2013.01); *G06F 12/0893* (2013.01); *G06F 2212/60* (2013.01)

(58) Field of Classification Search
None
See application file for complete search history.

(56) References Cited

U.S. PATENT DOCUMENTS

| | | | | |
|---|---|---|---|---|
| 5,043,885 A | * | 8/1991 | Robinson | .............. G06F 12/124 711/133 |
| 2008/0256326 A1 | * | 10/2008 | Patterson | .......... G06F 17/30312 711/206 |
| 2009/0144389 A1 | | 6/2009 | Sakuta | |
| 2011/0145816 A1 | | 6/2011 | Glikson et al. | |
| 2013/0346374 A1 | * | 12/2013 | Wolf | ................. G06F 17/30091 707/685 |

FOREIGN PATENT DOCUMENTS

JP   2009-140053   6/2009
JP   2011-123891   6/2011

* cited by examiner

*Primary Examiner* — Duc Doan
(74) *Attorney, Agent, or Firm* — Staas & Halsey LLP

(57) ABSTRACT

A storage device includes a memory device and a processor. The memory device is configured to store therein a plurality of data pieces. The processor is configured to determine overlapping degrees of the plurality of data pieces stored in the memory device. The processor is configured to determine, on basis of the determined overlapping degrees, an order in which a plurality of information pieces for identifying the respective data pieces are to be sent to another storage device.

10 Claims, 14 Drawing Sheets

STORAGE DEVICE AND STORAGE SYSTEM

CROSS-REFERENCE TO RELATED APPLICATION

This application is based upon and claims the benefit of priority from the prior Japanese Patent Application No. 2015-018372 filed on Feb. 2, 2015, the entire contents of which are incorporated herein by reference.

FIELD

The embodiments discussed herein are related to a storage device and a storage system.

BACKGROUND

It has been known that a storage system performs migration processing of migrating data between a plurality of storage devices via a network.

In such a storage system, there may be a case where an access request is received at a storage device serving as a data migration destination for data of which migration processing from a storage device serving as a data migration origin has not been completed. In such a case, there is known a technology that the storage device serving as the data migration destination acquires the requested data from the storage device serving as the data migration origin via the network.

Related techniques are disclosed in, for example, Japanese Laid-Open Patent Publication No. 2009-140053 and Japanese Laid-Open Patent Publication No. 2011-123891.

However, when data to be accessed is acquired from the storage device serving as the migration origin, there is a problem in that a path in the network becomes a bottleneck so that the generated access request may not be processed promptly.

SUMMARY

According to an aspect of the present invention, provided is a storage device including a memory device and a processor. The memory device is configured to store therein a plurality of data pieces. The processor is configured to determine overlapping degrees of the plurality of data pieces stored in the memory device. The processor is configured to determine, on basis of the determined overlapping degrees, an order in which a plurality of information pieces for identifying the respective data pieces are to be sent to another storage device.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT

Figure 1:
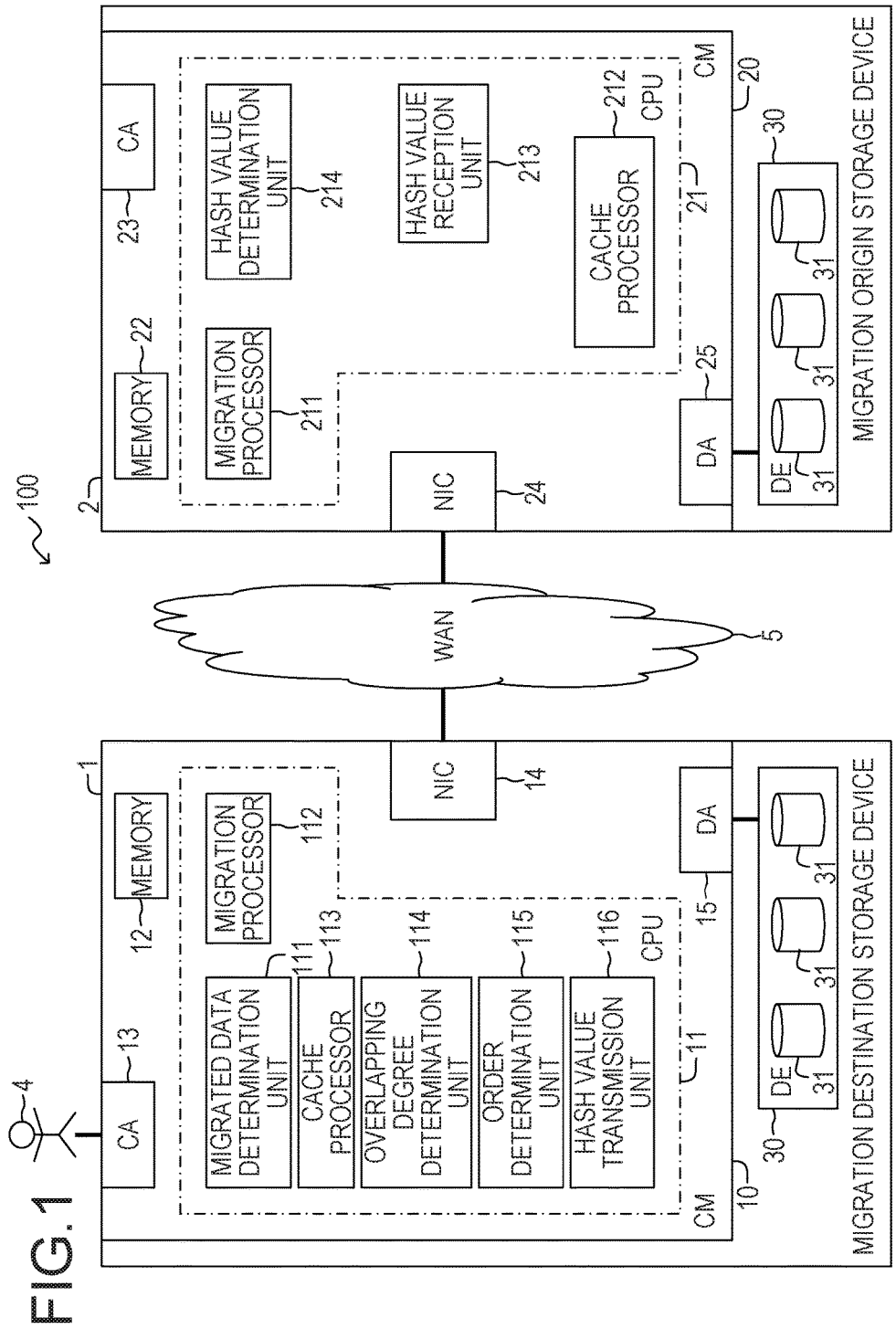
FIG. 1 is a diagram illustrating an exemplary functional configuration of a storage system according to an embodiment.

Hereinafter, an embodiment of a storage device and a storage system will be described with reference to the drawings. The embodiment described below is merely illustrative only and is not intended to exclude application of various modifications and techniques which are not specified in the embodiment. That is, the present embodiment may be implemented through various modifications without departing from the spirit thereof.

Each drawing is not intended to include only the constitutional elements illustrated therein, but may include other functions or the like.

Hereinafter, in the drawings, similar reference numerals indicate similar parts, and thus redundant descriptions thereof will be omitted.

FIG. 1 is a diagram illustrating an exemplary functional configuration of a storage system according to the embodiment.

A storage system 100 illustrated in FIG. 1 provides a storage area to a host device (not illustrated), and includes a storage device 1 and a storage device 2. The storage system 100 has a function of performing data migration processing of migrating data between the storage device 1 and the storage device 2. Hereinafter, in the present embodiment, an example in which data are migrated from the storage device 2 to the storage device 1 will be described. Hereinafter, the storage device 1 may be referred to as a "migration destination storage device 1," and the storage device 2 may be referred to as a "migration origin storage device 2."

The migration destination storage device 1 and the migration origin storage device 2 are communicably connected to each other via, for example, a wide area network (WAN) 5.

A user 4 issues, via a host device (not illustrated), an instruction of data input/output (I/O) or an instruction of data migration processing between the migration destination storage device 1 and the migration origin storage device 2, to the storage devices 1 and 2.

Each of the storage devices 1 and 2 is a device equipped with a plurality of memory devices 31 to be described later and providing a storage area to the host device (not illustrated), and distributes data to the plurality of memory devices 31 using, for example, a redundant array of inexpensive disks (RAID) to store the data in a redundant state.

Hereinafter, before a functional configuration of the storage devices 1 and 2 according to the present embodiment is described, data migration processing in storage systems 100a and 100b as a related art will be described with reference to FIGS. 2 and 3.

Figure 2:
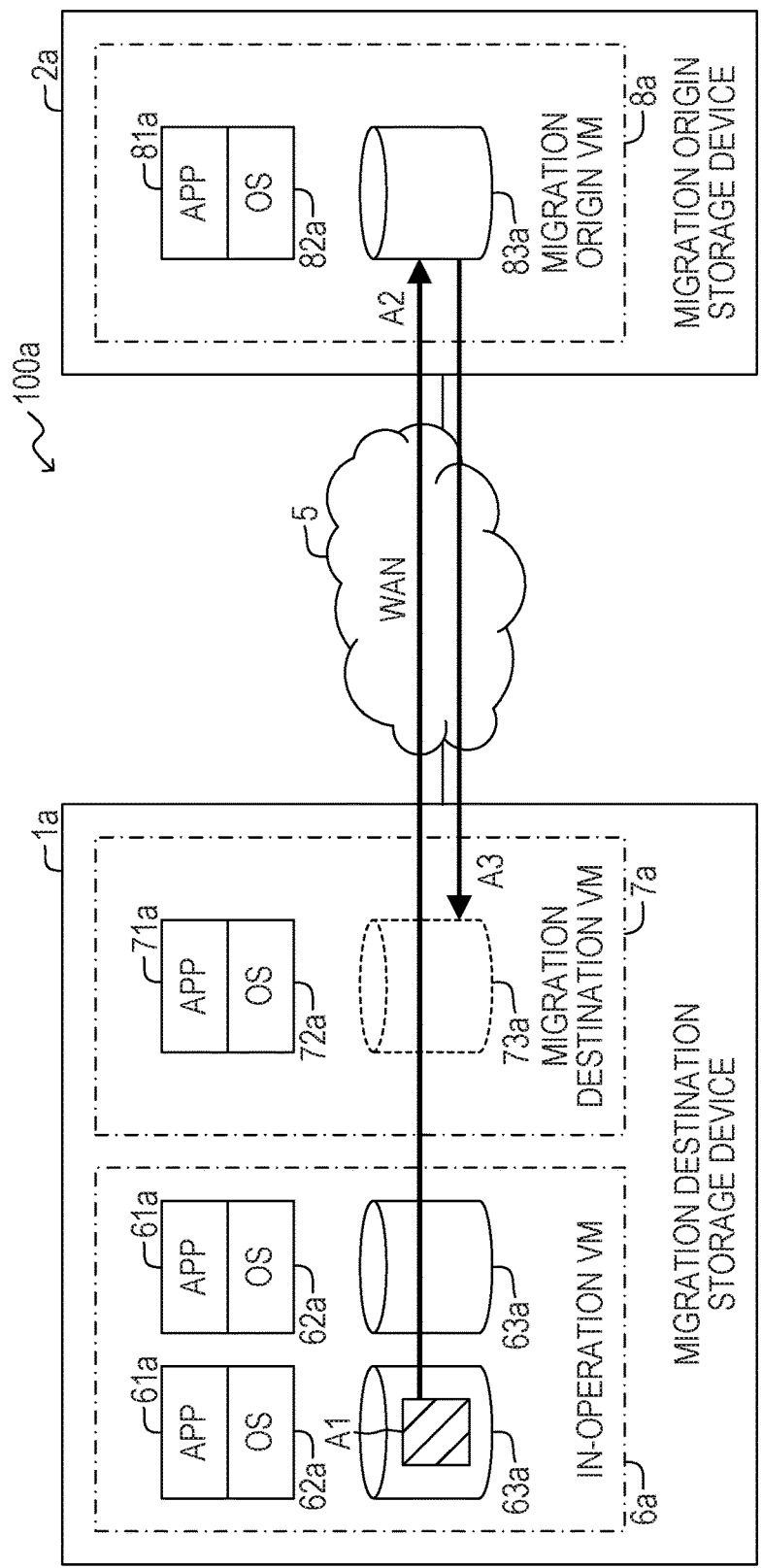
FIG. 2 is a diagram illustrating a first example of data migration processing in a storage system as a related art.

FIG. 2 is a diagram illustrating a first example of data migration processing in a storage system as a related art.

A storage system 100a illustrated in FIG. 2 provides a storage area to a host device (not illustrated), and includes a migration destination storage device 1a and a migration origin storage device 2a.

The migration destination storage device 1a and the migration origin storage device 2a are communicably connected to each other via, for example, a WAN 5.

Hereinafter, the migration destination storage device 1a and the migration origin storage device 2a may be collectively referred to as storage devices 1a and 2a.

Each of the storage devices 1a and 2a is a device equipped with a plurality of memory devices (not illustrated) and providing a storage area to the host device (not illustrated), and distributes data to the plurality of memory devices (not illustrated) using, for example, a RAID to store the data in a redundant state.

In the example illustrated in FIG. 2, the migration destination storage device is serves as a storage device of a data migration destination in data migration processing, and the migration origin storage device 2a serves as a storage device of a data migration origin in the data migration processing.

A central processing unit (CPU) (not illustrated) provided in the migration destination storage device is executes a program to deploy an in-operation virtual machine (VM) 6a and a migration destination VM 7a.

The in-operation VM 6a is a virtual machine which is in the middle of a work operation in the storage system 100a, and includes two applications (APPs) 61a, two operating systems (OSs) 62a, and two virtual disks (vDISKs) 63a.

The APP 61a has a function of performing data migration processing or the like.

The OS 62a implements a basic function such as managing hardware of the migration destination storage device 1a.

The vDISK 63a is a logical storage area that provides a storage area of a memory device (not illustrated) provided in the migration destination storage device 1a in a state recognizable to the host device (not illustrated) provided in the storage system 100a.

The migration destination VM 7a is a virtual machine placed in a state prior to a work operation in the storage system 100a, to which data is migrated from the migration origin storage device 2a. The migration destination VM 7a includes an APP 71a, an OS 72a, and a vDISK 73a. In the example illustrated in FIG. 2, the vDISK 73a is indicated by a broken line because the data migration processing has not been completed, and data is not stored in the vDISK 73a.

The APP 71a, the OS 72a, and the vDISK 73a of the migration destination VM 7a have similar functions to those of the APP 61a, the OS 62a, and the vDISK 63a of the in-operation VM 6a. Accordingly, descriptions on the functions of the APP 71a, the OS 72a, and the vDISK 73a of the migration destination VM 7a will be omitted.

A CPU (not illustrated) provided in the migration origin storage device 2a executes a program to deploy a migration origin VM 8a.

The migration origin VM 8a is a VM which stores data (to-be-migrated data) to be migrated to the migration destination storage device 1a, and includes an APP 81a, an OS 82a, and a vDISK 83a.

The APP 81a, the OS 82a, and the vDISK 83a of the migration origin VM 8a have similar functions to those of the APP 61a, the OS 62a, and the vDISK 63a of the in-operation VM 6a. Accordingly, descriptions on the functions of the APP 81a, the OS 82a, and the vDISK 83a of the migration origin VM 8a will be omitted.

In the example illustrated in FIG. 2, data A1 is stored in the vDISK 63a of the in-operation VM 6a.

The migration destination storage device 1a sends a hash value for identifying data A1 to the migration origin storage device 2a via the WAN 5 (A2). That is, the migration destination storage device 1a sends, to the migration origin storage device 2a, hint information for the data migration processing, which indicates that data A1 is stored in the migration destination storage device 1a.

The migration origin storage device 2a determines whether the hash value received from the migration destination storage device 1a is identical to a hash value identified by data stored in the vDISK 83a of the migration origin VM 8a. When it is determined that the hash value is identical, the migration origin storage device 2a sends, to the migration destination storage device 1a, the hash value which is determined to be identical (A3).

As described above, according to the processing A2 and A3 of FIG. 2, since only the hash value is sent and received via the WAN 5, an amount of data transmitted between the storage devices 1a and 2a may be reduced, and as a result, the data migration processing may be performed at a high speed.

However, there is a problem in that, among the data stored in the vDISKs 63a in operation, the data for which a hash value is to be sent to the migration origin storage device 2a by the migration destination storage device 1a needs to be estimated on the basis of the data stored in the vDISKs 63a in operation. That is, the migration destination storage device 1a needs to select a hash value on the basis of the data stored in the vDISK 63a in operation from the operation initiation of the storage system 100a, and data stored in the vDISK 63a in operation after having been migrated from the migration origin storage device 2a.

Figure 3:
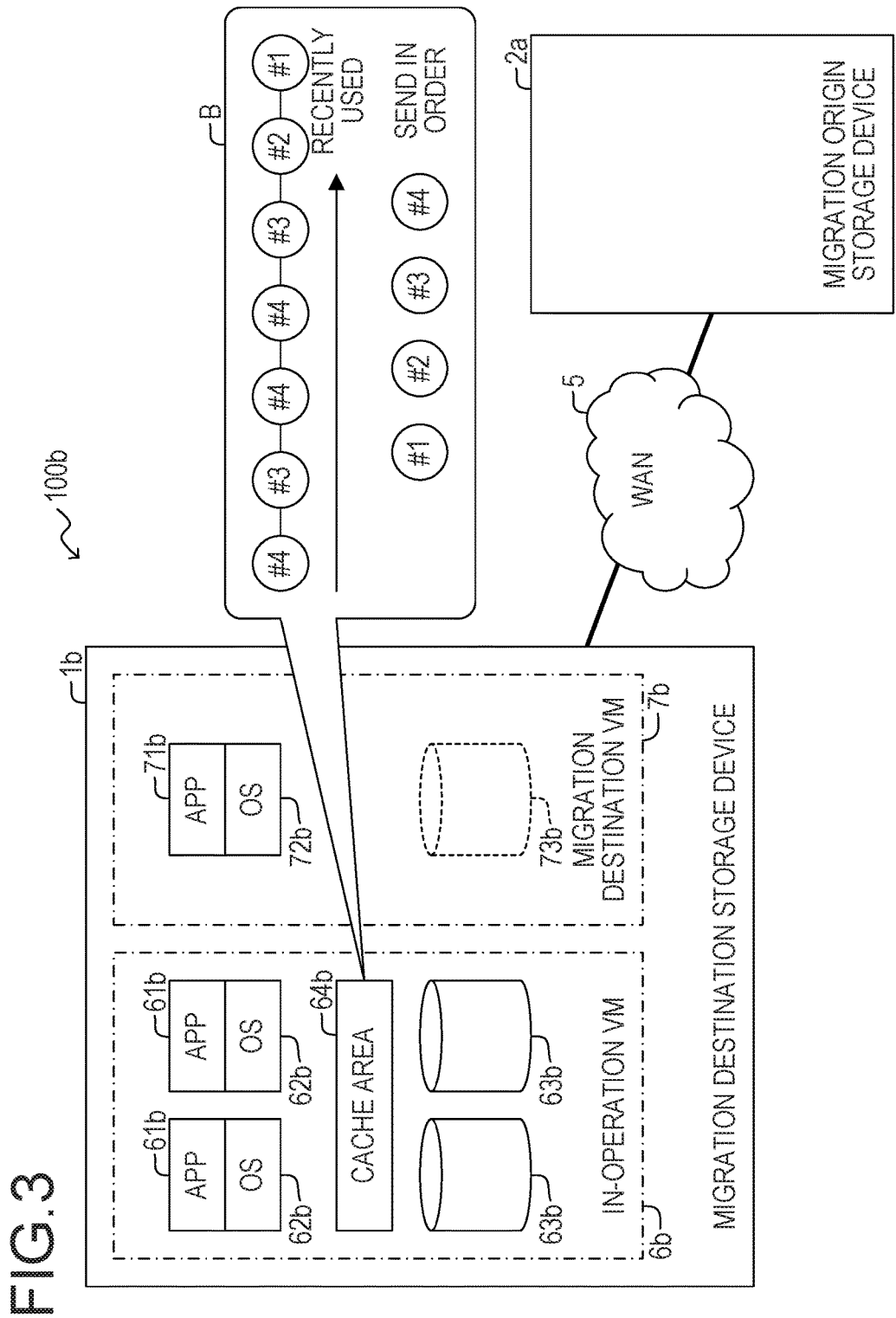
FIG. 3 is a diagram illustrating a second example of data migration processing in a storage system as a related art.

FIG. 3 is a diagram illustrating a second example of data migration processing in a storage system as a related art.

A storage system 100b illustrated in FIG. 3 provides a storage area to a host device (not illustrated), and includes a migration destination storage device 1b and a migration origin storage device 2a. The storage system 100b illustrated in FIG. 3 includes a similar migration origin storage device 2a to the migration origin storage device 2a illustrated in FIG. 2, and thus, an illustration of the functional configuration of the migration origin storage device 2a is omitted.

The migration destination storage device 1b and the migration origin storage device 2a are communicably connected to each other via, for example, a WAN 5.

Hereinafter, the migration destination storage device 1b and the migration origin storage device 2a may be collectively referred to as storage devices 1b and 2a.

Each of the storage devices 1b and 2a is a device equipped with a plurality of memory devices (not illustrated) and providing a storage area to the host device (not illustrated), and distributes data to the plurality of memory devices (not illustrated) using, for example, a RAID to store the data in a redundant state.

In the example illustrated in FIG. 3, the migration destination storage device 1b serves as a storage device of a data migration destination in data migration processing, and the migration origin storage device 2a serves as a storage device of a data migration origin in the data migration processing.

A CPU (not illustrated) provided in the migration destination storage device 1b executes a program to deploy an in-operation VM 6b and a migration destination VM 7b.

The in-operation VM 6b and the migration destination VM 7b illustrated in FIG. 3 includes similar functions to those of the in-operation VM 6a and the migration destination VM 7a illustrated in FIG. 2, respectively. However, unlike the in-operation VM 6a illustrated in FIG. 2, the in-operation VM 6b illustrated in FIG. 3 includes a cache area 64b. Accordingly, descriptions on the functions of the in-operation VM 6b and the migration destination VM 7b, other than the cache area 64b, will be omitted.

The cache area 64b is an area associated with an area of a memory (not illustrated) provided in the migration destination storage device 1b. In the cache area 64b, in response to I/O to vDISKs 63b in operation, a plurality of data (entry members) are stored in the order of Least Recently Used (LRU), Least Frequently Used (LFU), or the like.

In the example illustrated in FIG. 3, one data piece #1, one data piece #2, two data pieces #3 and three data pieces #4 are stored in the cache area 64b (B). Specifically, in the cache area 64b, data #1 to #4 are stored such that a reverse order of usage, that is, data #1, data #2, data #3, data #4, data #4, data #3, and data #4 is to be identified. In this case, the migration destination storage device 1b sends hash values for identifying data #1 to #4 to the migration origin storage device 2a, in the order of data #1, data #2, data #3, and data #4. Sending and receiving processing of the hash values between the storage devices 1b and 2a are similar to the processing A2 and A3 of FIG. 2, and thus descriptions thereof will be omitted.

As described above, according to the processing B of FIG. 3, when sending and receiving processing of the hash values are performed in reverse order of usage in the migration destination storage device 1b, the data migration processing of data which have recently been used in the migration destination storage device 1b may be completed in an earlier stage. In general, since there is a high possibility that the recently used data may correspond to frequently used data, by performing data migration processing sequentially from the recently used data, a probability that data required for the I/O processing have been migrated may be increased to contribute to a high-speed I/O processing.

However, there is a problem in that data migration processing of data to be used by the migration destination storage device 1b (the migration destination VM 7b) is not completed in an earlier stage when the to-be-migrated data does not include data recently used in the migration destination storage device 1b. For example, in the processing B of FIG. 3, the migration destination storage device 1b first sends hash values corresponding to an order of data #1 and data #2 to the migration origin storage device 2a. However, when data identical to the data #1 and #2 corresponding to the hash values firstly sent by the migration destination storage device 1b is not stored in the migration origin storage device 2a, a completion time for the migration processing on data #3 and #4 is delayed. Thus, there is a problem in that when I/O is generated for the data #3 and #4, the migration destination storage device 1b needs a time for processing the generated I/O.

Figure 4:
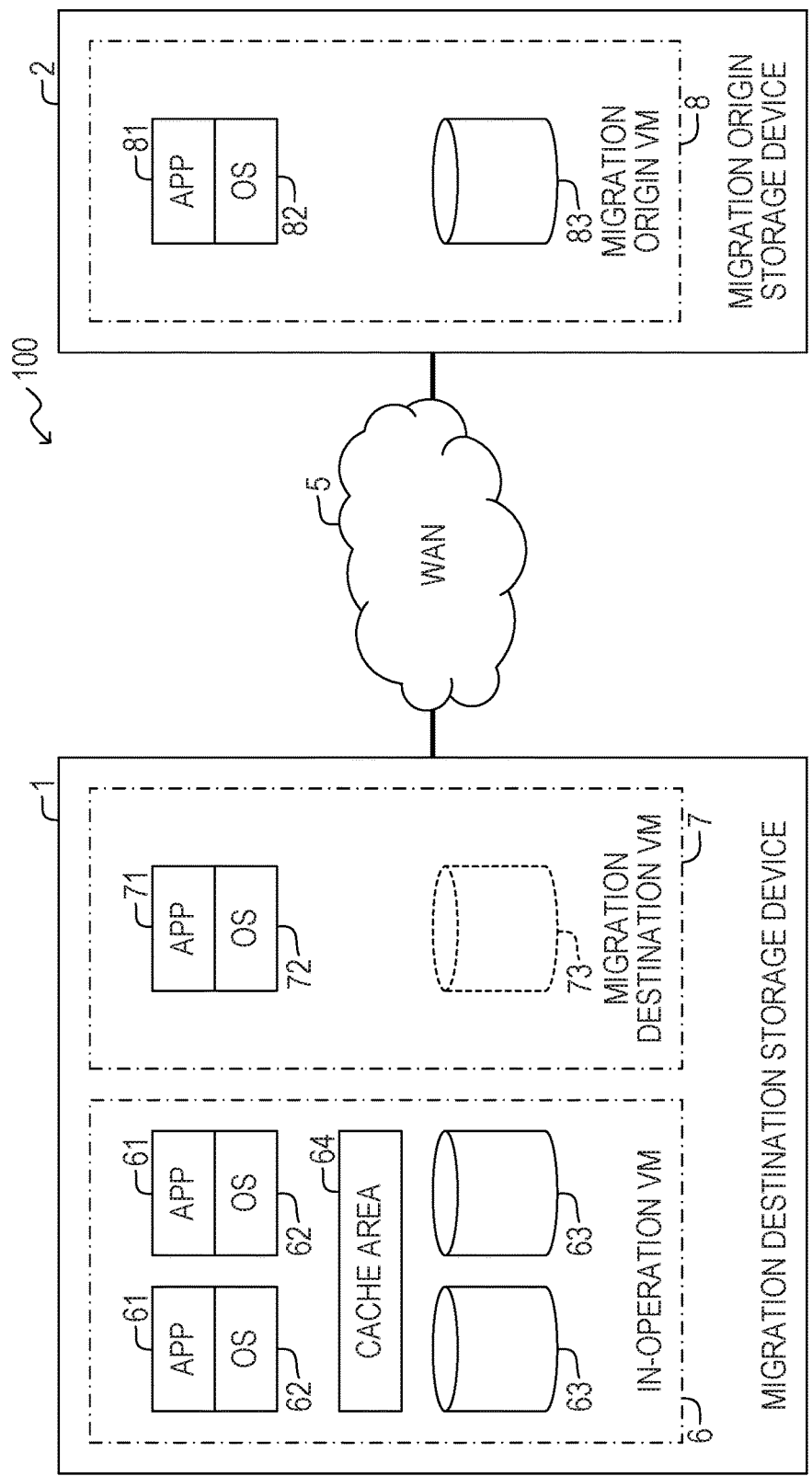
FIG. 4 is a diagram illustrating a virtual environment in a storage system according to an embodiment.

FIG. 4 is a diagram illustrating a virtual environment in a storage system according to the embodiment.

In the storage system 100 according to the present embodiment, as illustrated in FIG. 4, a CPU 11 (to be described below with reference to FIG. 1) provided in the migration destination storage device 1 executes a program to deploy an in-operation VM 6 and a migration destination VM 7.

In the example illustrated in FIG. 4, the in-operation VM 6 is a virtual machine which is in the middle of a work operation in the storage system 100, and includes two APPs 61, two OSs 62, two vDISKs 63 and one cache area 64.

The APP 61 has a function of performing data migration processing or the like.

The OS 62 implements a basic function such as managing hardware of the migration destination storage device 1.

The vDISK 63 is a logical storage area that provides a storage area of the memory devices 31 (to be described below with reference to FIG. 1) provided in the migration destination storage device 1 in a state recognizable to the host device (not illustrated) provided in the storage system 100.

The cache area 64 is an area associated with an area used as a cache memory in a memory 12 (to be described below with reference to FIG. 1) provided in the migration destination storage device 1. In the cache area 64, in response to I/O to the vDISK 63 in operation, a plurality of data (entry members) are stored in the order of usage results such as LRU, LFU, or the like.

Hereinafter, in the present embodiment, descriptions will be made on an example in which data is stored in the cache area 64 on the basis of an algorithm of LRU.

The migration destination VM 7 is a virtual machine placed in a state prior to a work operation in the storage system 100, to which data is migrated from the migration origin storage device 2. The migration destination VM 7 includes an APP 71, an OS 72, and a vDISK 73. In the example illustrated in FIG. 4, the vDISK 73 is indicated by a broken line because data migration processing has not been completed, and data is not stored in the vDISK 73.

The APP 71, the OS 72, and the vDISK 73 of the migration destination VM 7 have similar functions to those of the APP 61, the OS 62, and the vDISK 63 of the in-operation VM 6. Accordingly, descriptions on the functions of the APP 71, the OS 72, and the vDISK 73 of the migration destination VM 7 will be omitted.

A CPU 21 (to be described below with reference to FIG. 1) provided in the migration origin storage device 2 executes a program to deploy a migration origin VM 8.

The migration origin VM 8 is a VM which stores data to be migrated to the migration destination storage device 1, and includes an APP 81, an OS 82, and a vDISK 83.

The APP 81, the OS 82, and the vDISK 83 of the migration origin VM 8 have similar functions to those of the APP 61, the OS 62, and the vDISK 63 of the in-operation VM 6. Accordingly, descriptions on the functions of the APP 81, the OS 82, and the vDISK 83 of the migration origin VM 8 will be omitted.

Hereinafter, with reference to FIG. 1, descriptions will be made on a functional configuration of the storage devices 1 and 2 according to the present embodiment.

The migration destination storage device 1 includes a controller module (CM) 10 and a disk enclosure (DE) 30.

The DE 30 is communicably connected to the CM 10 through an access path, and includes a plurality of memory devices 31 (three memory devices in FIG. 1).

The memory device 31 is a known device configured to store therein data such that the data is readable and writable, and is, for example, a hard disk drive (HDD) or a solid state drive (SSD).

The CM 10 is a control device configured to perform various controls. The CM 10 performs various controls in accordance with a storage access request (access control signal: hereinafter, referred to as host I/O) from a host device (not illustrated). In the example illustrated in FIG. 1, the migration destination storage device 1 includes only one CM 10, but not limited thereto. The migration destination storage device 1 may include two or more CMs 10 in order to achieve the redundancy of the system. The CM 10 includes the CPU 11 (computer), the memory 12 (memory devices), a communication adaptor (CA) 13, a network interface card (NIC) 14, and a device adaptor (DA) 15.

The CA 13 is an interface controller that communicably interconnects the CM 10 and the host device (not illustrated).

The NIC 14 is a communication adapter configured to connect the migration destination storage device 1 to an external network such as, for example, the WAN 5.

The DA 15 is an interface configured to communicably interconnect the CM 10 and the DE 30, and is, for example, a fiber channel (FC) adapter. The CM 10 performs writing or reading of data to or from the memory devices 31 via the DA 15.

The memory 12 is a memory device that includes a read-only memory (ROM) and a random access memory (RAM). In the ROM of the memory 12, programs such as a basic input/output system (BIOS) are recorded. The programs on the memory 12 are appropriately read and executed by the CPU 11. The RAM of the memory 12 is used as a primary recording memory (cache memory) or a working memory.

The CPU 11 is a processing device configured to perform various controls or calculations, and executes an OS program or application programs stored in the memory 12 to achieve various functions. That is, the CPU 11, as illustrated in FIG. 1, serves as a migrated data determination unit 111, a migration processor 112, a cache processor 113, an overlapping degree determination unit 114, an order determination unit 115, and a hash value transmission unit 116 (transmission unit).

A program (control program) for achieving the functions of the migrated data determination unit 111, the migration processor 112, the cache processor 113, the overlapping degree determination unit 114, the order determination unit 115, and the hash value transmission unit 116 as described above, is provided in a form recorded in a computer-readable recording medium such as, for example, a flexible disk, a compact disc (CD) such as CD-ROM, CD-R, and CD-RW, a digital versatile disc (DVD) such as a DVD-ROM, a DVD-RAM, a DVD-R, a DVD+R, a DVD-RW, a DVD+RW, and a HD-DVD, a Blu-ray disk, a magnetic disk, an optical disk, or a magneto-optical disk. Then, the computer reads the program from the recording medium through a reading device (not illustrated), and transmits the program to an internal or external recording device so as to store the program in the recording device and use it. The program may be recorded in a memory device (recording medium) such as, for example, a magnetic disk, an optical disk, or a magneto-optical disk, so as to be provided to the computer from the memory device through a communication path.

When the functions of the migrated data determination unit 111, the migration processor 112, the cache processor 113, the overlapping degree determination unit 114, the order determination unit 115, and the hash value transmission unit 116 are achieved, the program stored in the internal memory device (the memory 12 in the present embodiment) is executed by a microprocessor (the CPU 11 in the present embodiment) of the computer. The program recorded in the recording medium may be read and executed by the computer.

The migrated data determination unit 111 determines whether data to be migrated from the migration origin storage device 2 to the migration destination storage device 1 has been migrated to the memory devices 31 of the migration destination storage device 1.

The migration processor 112 performs migration processing of data between the migration destination storage device 1 and the migration origin storage device 2. Specifically, the migration processor 112 performs the migration processing of data by acquiring to-be-migrated data, which has been sent from the migration origin storage device 2 through the WAN 5 and the NIC 14, and storing the acquired data in the memory device 31.

The migration processor 112 receives, from the migration origin storage device 2, a hash value (identification information) for identifying to-be-migrated data. Specifically, the migration processor 112 receives a hash value sent by the migration origin storage device 2 through the WAN 5 and the NIC 14.

The migration processor 112 performs access processing of accessing the data stored in the migration origin storage device 2. Specifically, when the migrated data determination unit 111 determines that the to-be-migrated data has not been migrated to the migration destination storage device 1, the migration processor 112 accesses the data stored in the memory device 31 of the migration origin storage device 2 through the NIC 14 and the WAN 5.

When data stored in the memory devices 31 of the migration destination storage device 1 is accessed, the cache processor 113 temporarily stores the data (to-be-accessed data) to be accessed in the memory 12 in the order of usage results such as LRU, LFU, or the like. Specifically, when the migrated data determination unit 111 determines that the to-be-migrated data has been migrated to the migration destination storage device 1, the cache processor 113 temporarily stores the to-be-accessed data in the cache area 64 (see FIG. 4) of the memory 12. The cache processor 113 also temporarily stores the to-be-migrated data or the hash value acquired by the migration processor 112 from the migration origin storage device 2, in the cache area 64 of the memory 12.

Figure 5:
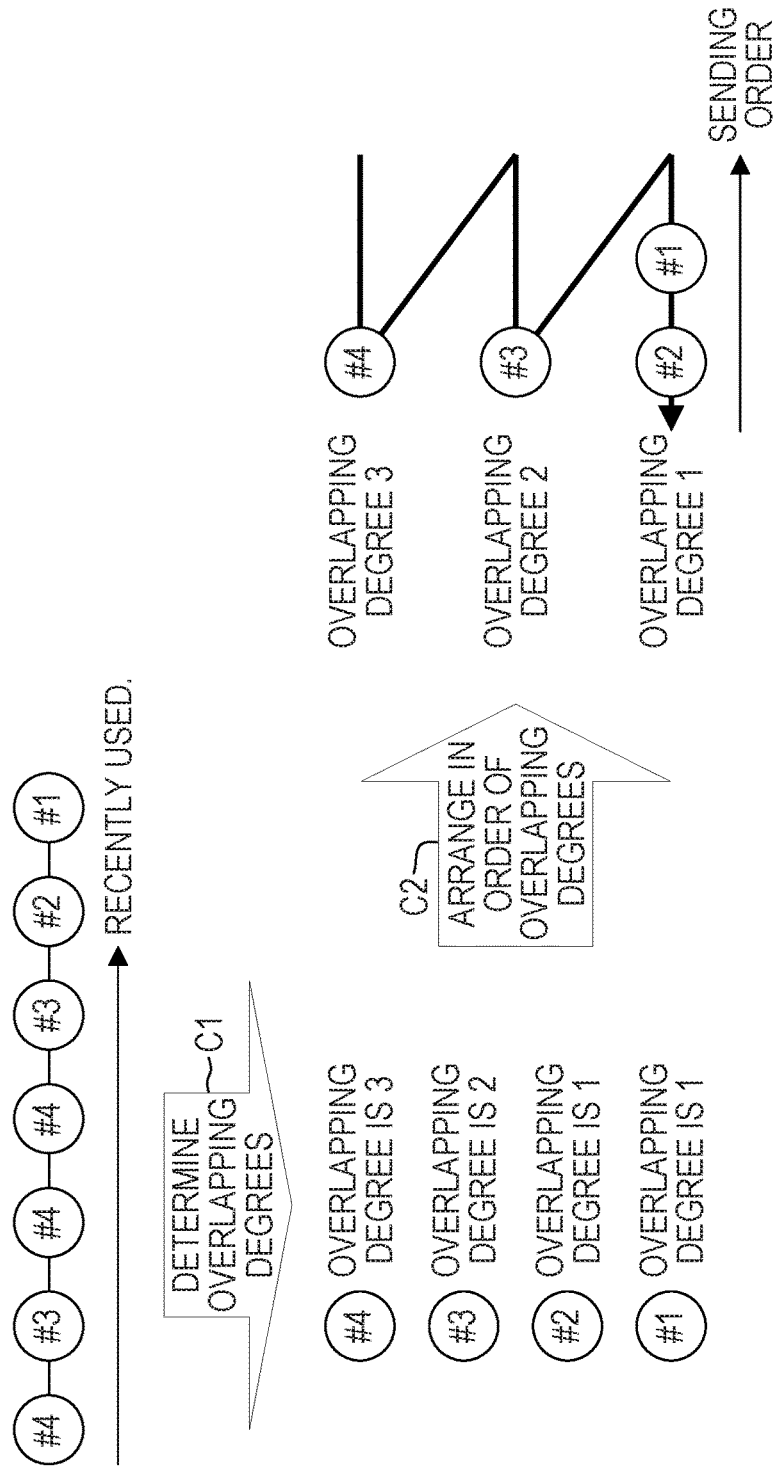
FIG. 5 is a diagram illustrating processing of determining an order of sending hash values in a storage system according to an embodiment.

FIG. 5 is a diagram illustrating processing of determining an order of sending hash values in the storage system according to the embodiment Hereinafter, in the example illustrated in FIG. 5, hash values for identifying data #1 to #4 are represented by hash values #1 to #4, respectively.

In the example illustrated in FIG. 5, the cache processor 113 stores data #1 to #4 in the cache area 64 such that the reverse order of usage of the data #1 to #4 is to be identified. Specifically, the cache processor 113 stores data #1 to #4 in the cache area 64 such that the order of data #1, data #2, data #3, data #4, data #4, data #3, and data #4 is to be identified.

Hereinafter, an array of data arranged in a row in reverse order of usage may be referred to as an LRU list.

The overlapping degree determination unit 114 determines overlapping degrees of a plurality of data pieces stored in the cache area 64 of the memory 12. Specifically, the overlapping degree determination unit 114 calculates the number (duplication number) of identical data pieces included in the cache area 64, and determines the calculated number (duplication number) for each identical data as an overlapping degree of each identical data.

In the example illustrated in FIG. 5, the overlapping degree determination unit 114 determines overlapping degrees of data #4, #3, #2, and #1 as 3, 2, 1, and 1, respectively (C1).

The order determination unit 115 determines an order in which the plurality of hash values are to be sent to the migration origin storage device 2, on the basis of the overlapping degrees determined by the overlapping degree determination unit 114. When there is a plurality of data pieces having the same overlapping degree determined by the overlapping degree determination unit 114, the order determination unit 115 determines the order on the basis of the usage results of the plurality of data pieces having the same overlapping degree.

In the example illustrated in FIG. 5, the order determination unit 115 determines, on the basis of the overlapping degrees determined by the overlapping degree determination unit 114, to send the plurality of hash values in the order of hash values #4, #3, #1, and #2, to the migration origin storage device 2 (C2). Since both the data #1 and #2 have an overlapping degree of 1, the order determination unit 115 determines to send a hash value #1 corresponding to data #1 that is more recently used than data #2, earlier than a hash value #2.

Hereinafter, an array of data arranged in a row for each overlapping degree may be referred to as an LRU list for each overlapping degree.

The hash value transmission unit 116 sends, on the basis of the order determined by the order determination unit 115, a plurality of hash values to the migration origin storage device 2 through the NIC 14 and the WAN 5.

In the example illustrated in FIG. 5, the hash value transmission unit 116 sends, on the basis of the order determined by the order determination unit 115, a plurality of hash values to the migration origin storage device 2 in the order of hash values #4, #3, #1, and #2.

As illustrated in FIG. 1, the migration origin storage device 2 includes a CM 20 and a DE 30.

The CM 20 is a control device configured to perform various controls. The CM 20 performs various controls in accordance with a host I/O from the host device (not illustrated). In the example illustrated in FIG. 1, the migration origin storage device 2 includes only one CM 20, but not limited thereto. The migration origin storage device 2 may include two or more CMs 20 in order to achieve the redundancy of the system. The CM 20 includes the CPU 21, a memory 22, a CA 23, a NIC 24, and a DA 25.

The memory 22, the CA 23, the NIC 24, and the DA 25 provided in the CM 20 have similar functions to those of the memory 12, the CA 13, the NIC 14, and the DA 15 provided in the CM 10, respectively, and thus, the descriptions on the memory 22, the CA 23, the NIC 24, and the DA 25 will be omitted.

The CPU 21 is a processing device configured to perform various controls or calculations, and executes an OS program or application programs stored in the memory 22 to achieve various functions. That is, the CPU 21, as illustrated in FIG. 1, serves as a migration processor 211, a cache processor 212, a hash value reception unit 213 (reception unit), and a hash value determination unit 214 (determination unit).

A program for achieving the functions of the migration processor 211, the cache processor 212, the hash value reception unit 213, and the hash value determination unit 214 as described above, is provided in a form recorded in a computer-readable recording medium such as, for example, a flexible disk, a CD such as CD-ROM, CD-R, and CD-RW, a DVD such as a DVD-ROM, a DVD-RAM, a DVD-R, a DVD+R, a DVD-RW, a DVD+RW, and a HD-DVD, a Blu-ray disk, a magnetic disk, an optical disk, or a magneto-optical disk. Then, the computer reads the program from the recording medium through a reading device (not illustrated), and transmits the program to an internal or external recording device so as to store the program in the recording device and use it. The program may be recorded in a memory device (recording medium) such as, for example, a magnetic disk, an optical disk, or a magneto-optical disk, so as to be provided to the computer from the memory device through a communication path.

When the functions of the migration processor 211, the cache processor 212, the hash value reception unit 213, and the hash value determination unit 214 are achieved, the program stored in the internal memory device (the memory 22 in the present embodiment) is executed by a microprocessor (the CPU 21 in the present embodiment) of the computer. The program recorded in the recording medium may be read and executed by the computer.

The hash value reception unit 213 receives a plurality of hash values sent by the hash value transmission unit 116 of the migration destination storage device 1, through the WAN 5 and the NIC 24.

The hash value determination unit 214 determines whether the hash values received by the hash value reception unit 213 are identical to hash values for identifying any of a plurality of data pieces stored in the memory devices 31 of the migration origin storage device 2. Specifically, the hash value determination unit 214 acquires the plurality of hash values received by the hash value reception unit 213. The hash value determination unit 214 makes an acquisition request of hash values to the cache processor 212, so as to acquire the hash values for identifying the data stored in the memory devices 31. The hash value determination unit 214 determines whether the hash values acquired from the hash value reception unit 213 are identical to any of the hash values acquired from the cache processor 212. The hash value determination unit 214 determines whether the hash values received by the hash value reception unit 213 are identical in the order in which they have been received.

The cache processor 212 performs a control of reading or writing of data from or to a cache memory.

When the data stored in the memory device 31 of the migration origin storage device 2 is accessed, the cache processor 212 temporarily stores the to-be-accessed data in a cache memory area of the memory 22. Specifically, the cache processor 212, on the basis of the access to the memory device 31 from the data migration processor 211, temporarily stores the to-be-accessed data in the cache memory area of the memory 22. The cache processor 212, on the basis of the acquisition request of the hash values from the hash value determination unit 214, temporarily stores hash values for identifying data stored in the memory devices 31, in the cache area of the memory 22.

The migration processor 211 performs data migration processing between the migration destination storage device 1 and the migration origin storage device 2. Specifically, the migration processor 211 performs the data migration processing by sending to-be-migrated data to the migration destination storage device 1 through the NIC 24 and the WAN 5.

The migration processor 211 sends, to the migration destination storage device 1, a hash value for identifying to-be-migrated data. Specifically, the migration processor 211 notifies of a hash value, which is determined to be identical by the hash value determination unit 214, among the plurality of hash values, to the migration destination storage device 1 through the NIC 24 and the WAN 5 so as to migrate the data to the migration destination storage device 1. The migration processor 211 performs a notification of hash values in the order in which the plurality of hash values have been determined to be identical by the hash value determination unit 214.

The migration processor 211 accesses the data stored in the migration origin storage device 2. Specifically, when the migrated data determination unit 111 of the migration destination storage device 1 determines that the to-be-migrated data has not been migrated to the migration destination storage device 1, the migration processor 211 receives the request from the migration destination storage device 1 through the WAN 5 and the NIC 24. The migration processor 211 accesses the data stored in the memory devices 31 of the migration origin storage device 2 through the cache processor 212.

Figure 6:
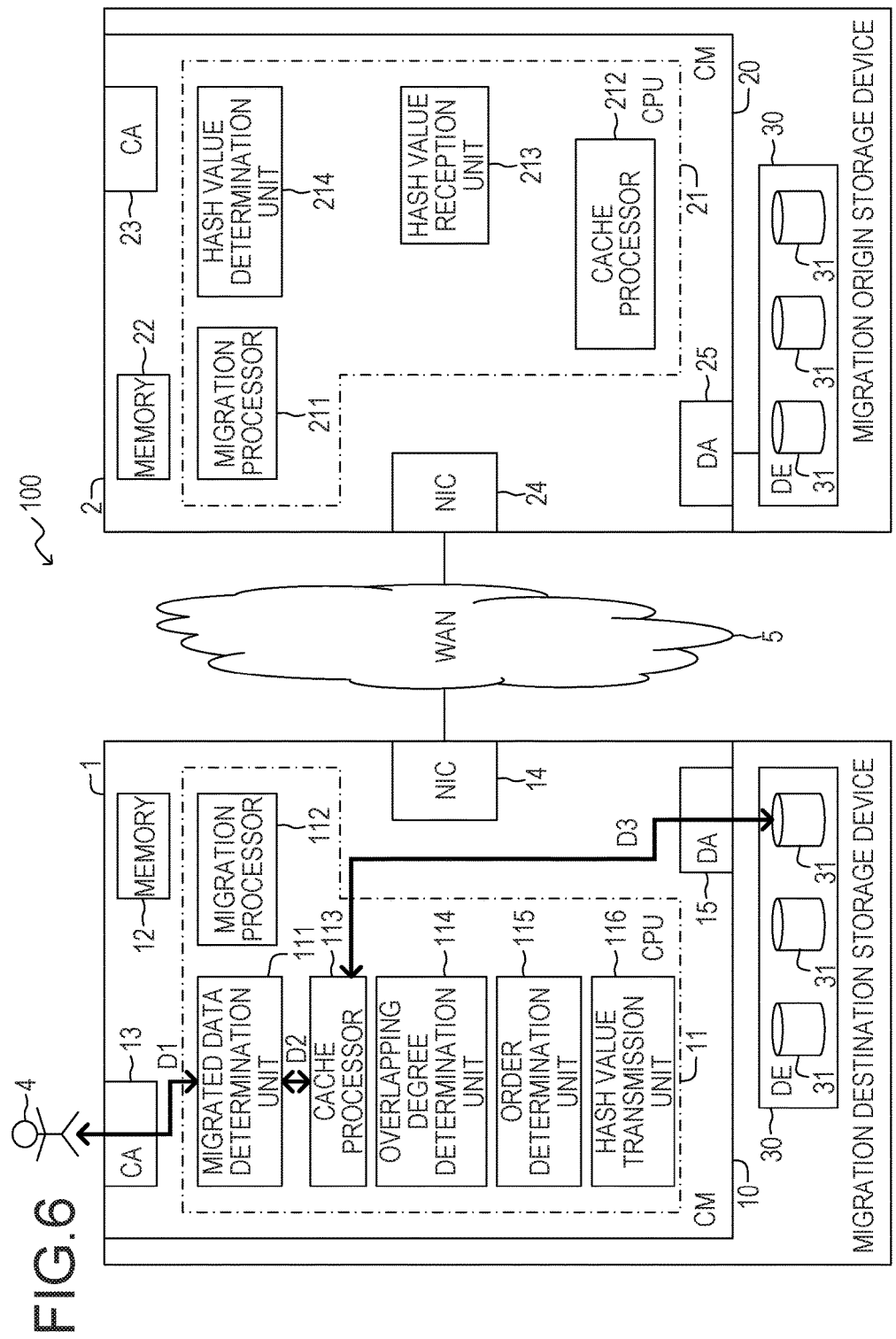
FIG. 6 is a diagram illustrating processing of accessing data stored in a migration destination storage device in a storage system according to an embodiment.

Processing of accessing data stored in the migration destination storage device in the storage system configured as described above according to an embodiment will be described with reference to FIG. 6.

A user 4 instructs, through a host device (not illustrated), the storage device 1 to access data (D1).

The migrated data determination unit 111 determines whether the to-be-accessed data has been migrated to the migration destination storage device 1. In the example illustrated in FIG. 6, since the to-be-accessed data has been migrated to the migration destination storage device 1, the migrated data determination unit 111 accesses the to-be-accessed data through the cache processor 113 (D2).

The cache processor 113 reads the to-be-accessed data from the memory device 31 of the migration destination storage device 1, and stores the read data in the cache area 64 of the memory 12 (D3).

The migrated data determination unit 111 reads the to-be-accessed data recorded in the cache area 64 (D2), and sends the data to the host device (not illustrated) (D1), and then the processing is completed.

As described above, an access to data stored in the migration destination storage device 1 is performed within a casing of the migration destination storage device 1.

Figure 7:
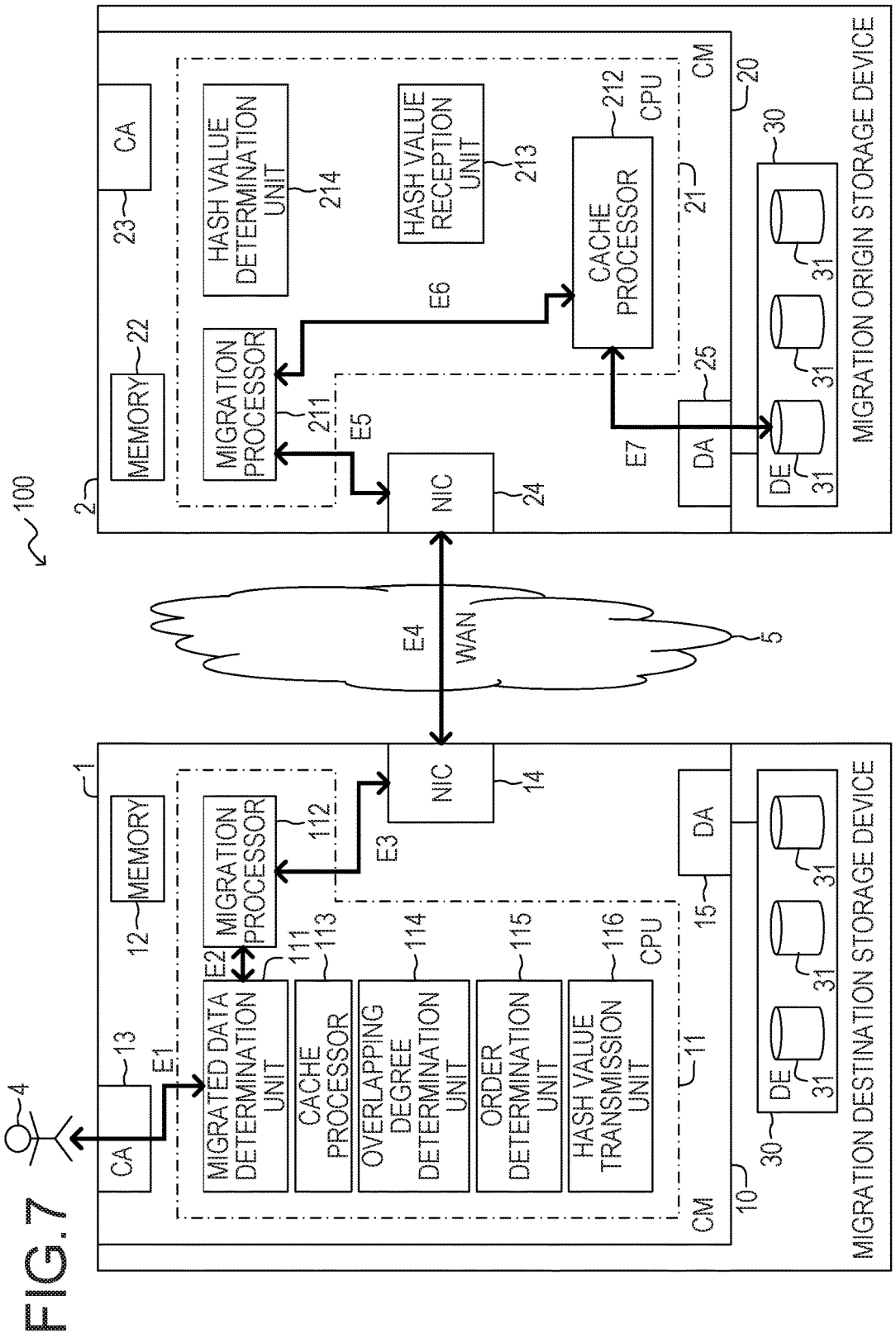
FIG. 7 is a diagram illustrating processing of accessing data stored in a migration origin storage device in a storage system according to an embodiment.

Hereinafter, processing of accessing data stored in the migration origin storage device in the storage system according to the embodiment will be described with reference to FIG. 7. That is, with reference to FIG. 7, descriptions will be made on an access to the data which has not been migrated from the migration origin storage device 2 to the migration destination storage device 1.

A user 4 instructs, through a host device (not illustrated), the storage device 1 to access data (E1).

The migrated data determination unit 111 determines whether the to-be-accessed data have been migrated to the migration destination storage device 1. In the example illustrated in FIG. 7, since the to-be-accessed data have not been migrated to the migration destination storage device 1, the migrated data determination unit 111 acquires data from the migration origin storage device 2 through the migration processor 112 (E2).

The migration processor 112 sends a data access request to the migration origin storage device 2 through the NIC 14 and the WAN 5 (E3 and E4).

The migration processor 211 of the migration origin storage device 2 receives the data access request from the migration destination storage device 1 through the WAN 5 and the NIC 24 (E4 and E5). The migration processor 211 accesses the to-be-accessed data through the cache processor 212 (E6).

The cache processor 212 reads the to-be-accessed data from the memory device 31, and stores the read data in the memory 22 (E7).

The migration processor 211 reads the to-be-accessed data stored in the memory 22 (E6), and sends the read data to the migration destination storage device 1 through the NIC 24 and the WAN 5 (E5 and E4).

The migration processor 112 of the migration destination storage device 1 receives the to-be-accessed data which have been sent from the migration origin storage device 2, through the WAN 5 and the NIC 14 (E4 and E3).

The migrated data determination unit 111 acquires the to-be-accessed data from the migration processor 112 (E2), and sends the data to the host device (not illustrated) (E1), and then the processing is completed.

As described above, an access to the data stored in the migration origin storage device is performed to the migration origin storage device 2 from the migration destination storage device 1 through the WAN 5.

Hereinafter, a notification of a hash value in the storage system according to the embodiment will be described with reference to FIGS. 8 and 9.

Figure 8:
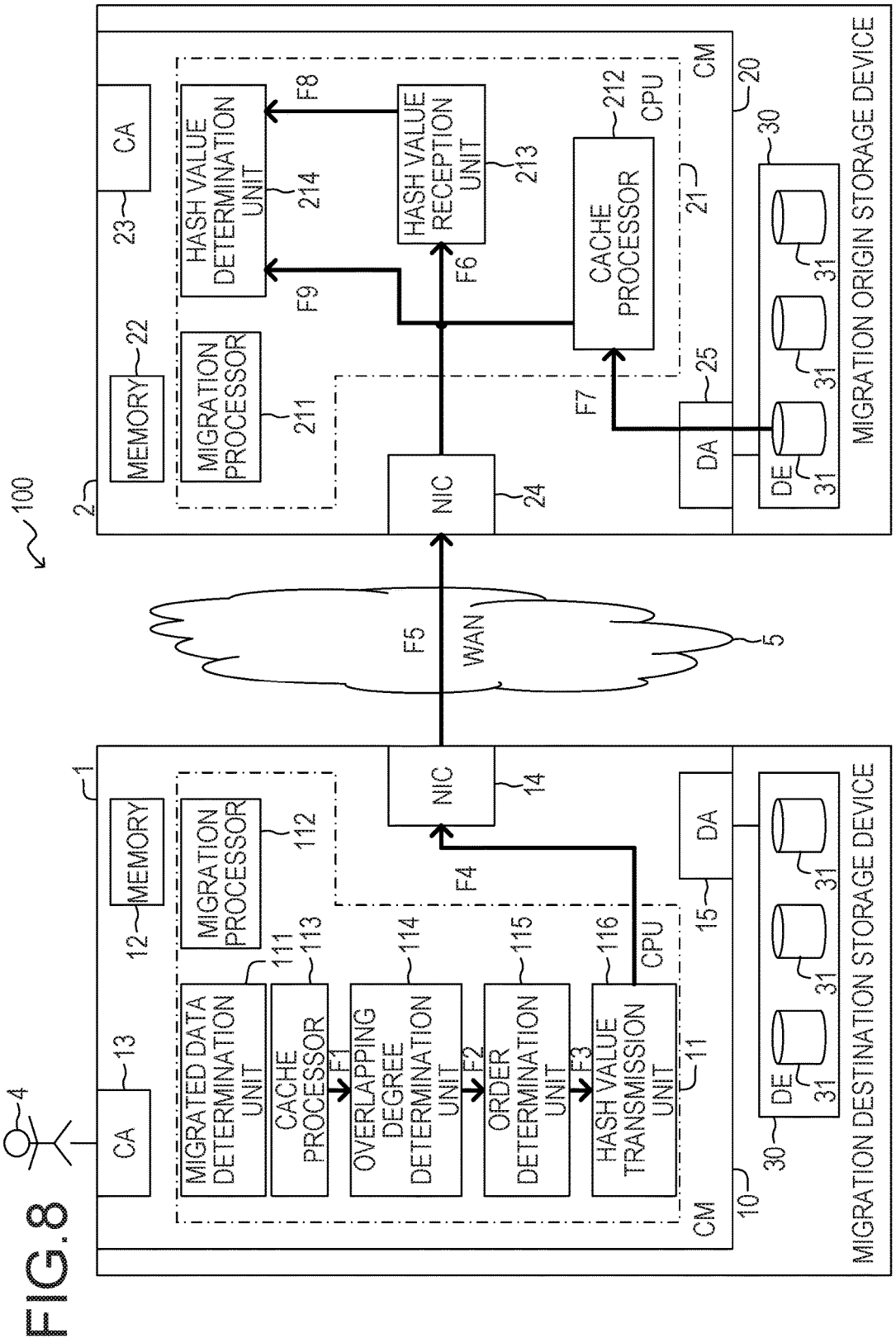
FIG. 8 is a diagram illustrating processing of notifying of a hash value in a storage system according to an embodiment.

The cache processor 113 of the migration destination storage device 1 reads a plurality of data pieces stored in the cache area 64 (F1 of FIG. 8).

The overlapping degree determination unit 114 determines overlapping degrees of the plurality of data pieces read by the cache processor 113 (F2 of FIG. 8).

The order determination unit 115 determines the order in which the plurality of hash values are to be sent to the migration origin storage device 2, on the basis of the overlapping degrees determined by the overlapping degree determination unit 114 (F3 of FIG. 8). When there are a plurality of data pieces having the same overlapping degree determined by the overlapping degree determination unit 114, the order determination unit 115 determines the order on the basis of the usage results of the plurality of data pieces having the same overlapping degree.

The hash value transmission unit 116 sends, in accordance with the order determined by the order determination unit 115, a plurality of hash values to the migration origin storage device 2 through the NIC 14 and the WAN 5 (F4 and F5 of FIG. 8).

The hash value reception unit 213 of the migration origin storage device 2 receives the plurality of hash values sent from the hash value transmission unit 116 of the migration destination storage device 1, through the WAN 5 and the NIC 24 (F5 and F6 of FIG. 8).

The cache processor 212 temporarily stores, in the memory 22, the hash values of the plurality of to-be-migrated data stored in the memory device 31 (F7 of FIG. 8).

The hash value determination unit 214 acquires the plurality of hash values received by the hash value reception unit 213 (F8 of FIG. 8). The hash value determination unit 214 makes an acquisition request of hash values to the cache processor 212, so as to acquire the hash values for identifying the data stored in the memory devices 31 (F9 of FIG.

8). The hash value determination unit 214 determines whether the hash values acquired from the hash value reception unit 213 are identical to any of the hash values acquired from the cache processor 212. The hash value determination unit 214 determines whether the hash values are identical in the order in which the plurality of hash values have been received by the hash value reception unit 213.

Figure 9:
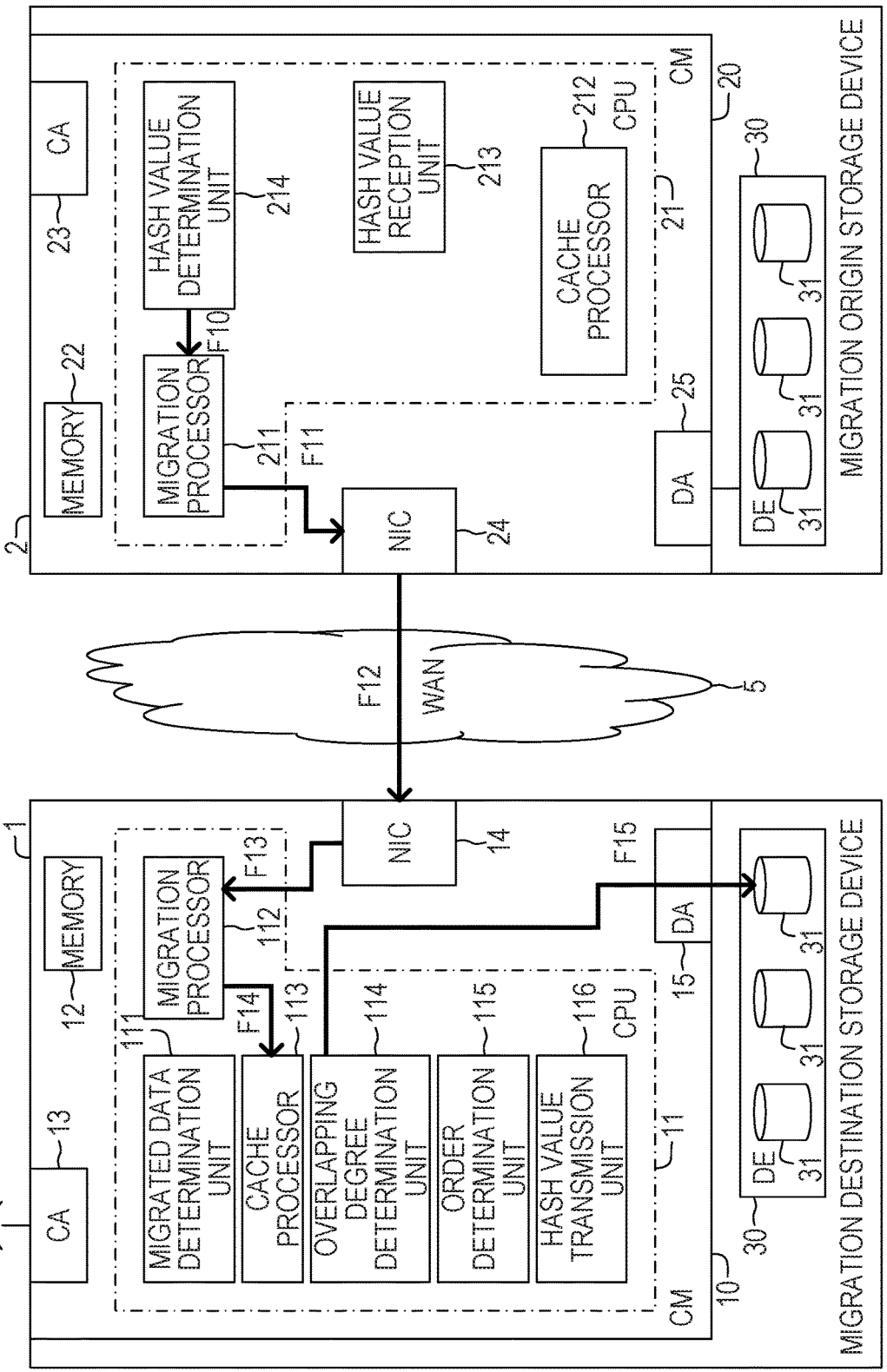
FIG. 9 is a diagram illustrating processing of notifying of a hash value in a storage system according to an embodiment.

The migration processor 211 acquires, among the plurality of hash values, hash values which are determined to be identical by the hash value determination unit 214, from the hash value determination unit 214 (F10 of FIG. 9). Then, the migration processor 211 notifies the migration destination storage device 1 of the acquired hash value through the NIC 24 and the WAN 5 (F11 and F12 of FIG. 9). The migration processor 211 performs the notification of the hash values to the migration destination storage device 1 in the order in which the plurality of hash values have been determined to be identical by the hash value determination unit 214.

The migration processor 112 of the migration destination storage device 1 receives the hash values sent by the migration origin storage device 2 through the WAN 5 and the NIC 14 (F12 and F13 of FIG. 9). The migration processor 112 records to-be-migrated data identified by the received hash value in the memory device 31 through the cache processor 113 (F14 of FIG. 9).

The cache processor 113 temporarily stores the to-be-migrated data in the cache area 64, and thereafter stores the to-be-migrated data from the cache area 64 to the memory device 31 (F15 of FIG. 9). Accordingly, the data migration processing from the migration origin storage device 2 to the migration destination storage device 1 is completed.

As described above, a notification of hash values is performed by sending only the hash values rather than data from the migration origin storage device 2 to the migration destination storage device 1. Accordingly, the speed of the data migration processing between the storage devices 1 and 2 may be increased.

Data, which is stored in the memory devices 31 of the migration origin storage device 2 and does not correspond to the hash values received from the migration destination storage device 1 by the hash value reception unit 213 of the migration origin storage device 2, is sent to the migration destination storage device 1 by data migration processing performed as described below.

Figure 10:
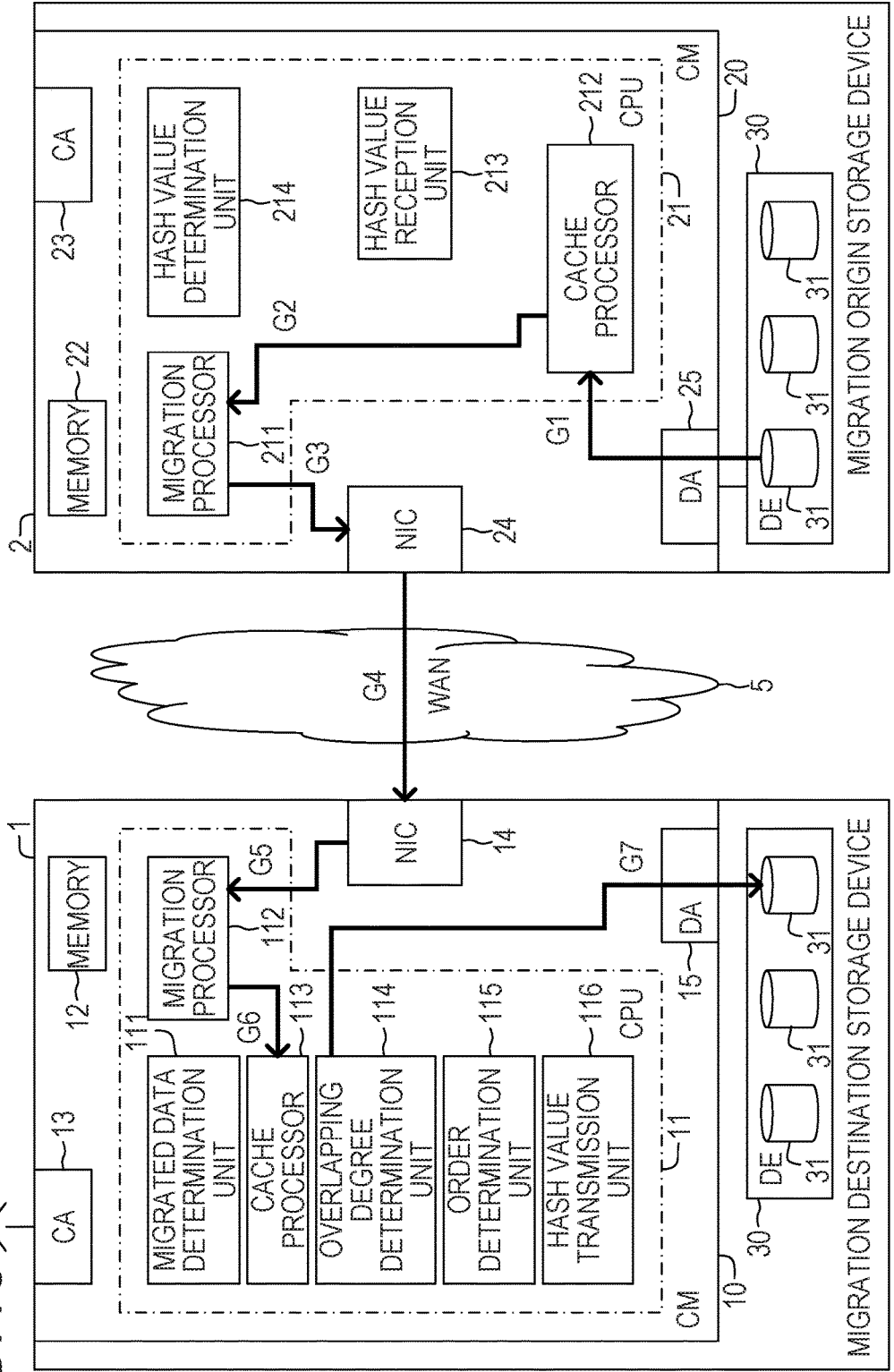
FIG. 10 is a diagram illustrating data migration processing in a storage system according to an embodiment.

Hereinafter, data migration processing in the storage system according to the embodiment will be described with reference to FIG. 10.

The cache processor 212 of the migration origin storage device 2 reads to-be-migrated data from the memory devices 31, and stores the read data in the memory 22 (G1).

The migration processor 211 reads the to-be-migrated data stored in the memory 22 (G2), and sends the read data to the migration destination storage device 1 through the NIC 24 and the WAN 5 (G3 and G4).

The migration processor 112 of the migration destination storage device 1 receives the to-be-migrated data sent from the migration origin storage device 2 through the WAN 5 and the NIC 14 (G4 and G5). Then, the migration processor 112 performs a recording of the to-be-migrated data through the cache processor 113 (G6).

The cache processor 113 temporarily stores the to-be-migrated data in the cache area 64, and stores the to-be-migrated data in the memory device 31 (G7), and then the processing is completed.

As described above, the data migration processing is performed to the migration destination storage device 1 from the migration origin storage device 2 through the WAN 5.

Hereinafter, a first example of LRU list creation processing in the storage system according to the embodiment will be described with reference to FIG. 11. Specifically, FIG. 11 describes LRU list creation processing in a case where removal of overlapping data (cache entries) in the cache area 64 is not supported.

The overlapping degree determination unit 114 sets a value of an index counter to be recorded in, for example, the memory 12 to "0" (S1). The value of the index counter refers to a counter value for an index that is defined for each cache entry in order to arrange cache entries even in the LRU list for each overlapping degree in the order of the cache entries in the original LRU list.

The overlapping degree determination unit 114 and the order determination unit 115 associate data pieces #1, #2, #3, #4, #4, #3, and #4 with indices 1, 2, 3, 4, 5, 6, and 7, respectively, to process the cache entries in reverse order of usage (S2 and H). Then, the processing is completed.

Hereinafter, details of S2 in FIG. 11 will be described with reference to FIG. 12. FIG. 12 is a flowchart that describes the details of a first example of LRU list creation processing in the storage system according to the embodiment.

The overlapping degree determination unit 114 determines whether the LRU list for an overlapping degree k includes a cache entry identical to a subjected cache entry (S11).

When the LRU list for the overlapping degree k includes an identical cache entry ("Yes" of S11), the overlapping degree determination unit 114 moves the identical cache entry to an LRU list for an overlapping degree k+1 from the LRU list for the overlapping degree k (S12).

The order determination unit 115 sorts the LRU list for the overlapping degree k+1 in descending order of the indices of the cache entries (S13), and the processing is completed.

When the LRU list for the overlapping degree k does not include an identical cache entry ("No" of S11), the overlapping degree determination unit 114 copies the subjected cache entry. Then, the overlapping degree determination unit 114 defines a value of a current index counter as an index of the subjected cache entry, and registers the copied cache entry in the LRU list for the overlapping degree 1 (S14).

The order determination unit 115 sorts the LRU list for the overlapping degree 1 in descending order of the indices of the cache entries (S15).

The order determination unit 115 increments the index counter (S16), and the processing is completed.

Hereinafter, a second example of LRU list creation processing in the storage system according to the embodiment will be described with reference to FIG. 13. Specifically, FIG. 13 describes LRU list creation processing in a case where the removal of overlapping cache entries in the cache area 64 is supported.

The overlapping degree determination unit 114 registers cache entries of an overlapping degree k in the LRU list for the overlapping degree k, in reverse order of usage of the cache entries in the original LRU list (S21).

Figure 13:
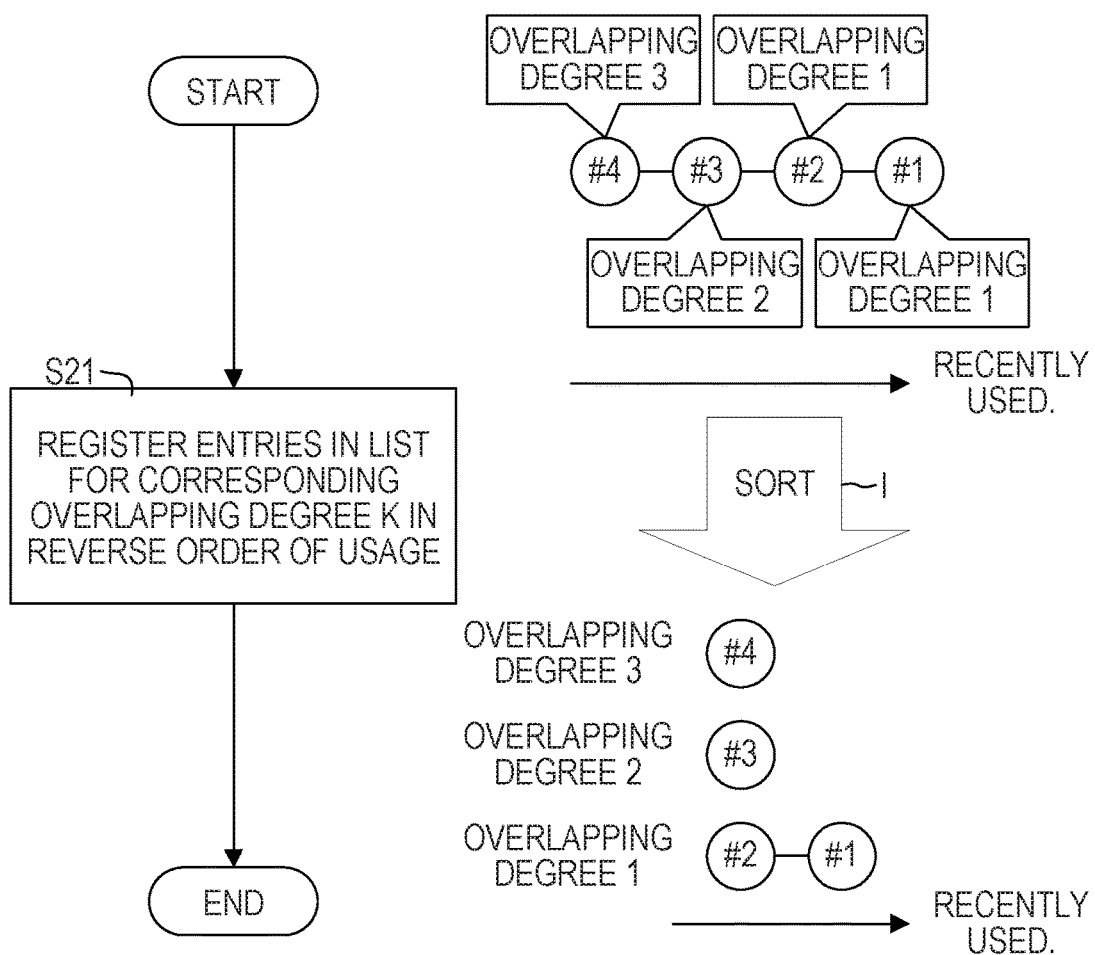
FIG. 13 is a flowchart illustrating a second example of LRU list creation processing in a storage system according to an embodiment.

In the example illustrated in FIG. 13, in the original LRU list, cache entries are registered in the order of data #1, #2, #3, and #4, and overlapping degrees of the data #1, #2, #3, and #4 are 1, 1, 2, and 3, respectively. The overlapping degree determination unit 114 classifies the plurality of cache entries by each overlapping degree so as to create an LRU list for each overlapping degree (I).

That is, as illustrated in FIG. 13, when the removal of the overlapping cache entries is supported for the cache area 64, the CPU 11 of the migration destination storage device 1 does not need to have a function of the order determination unit 115.

Figure 14:
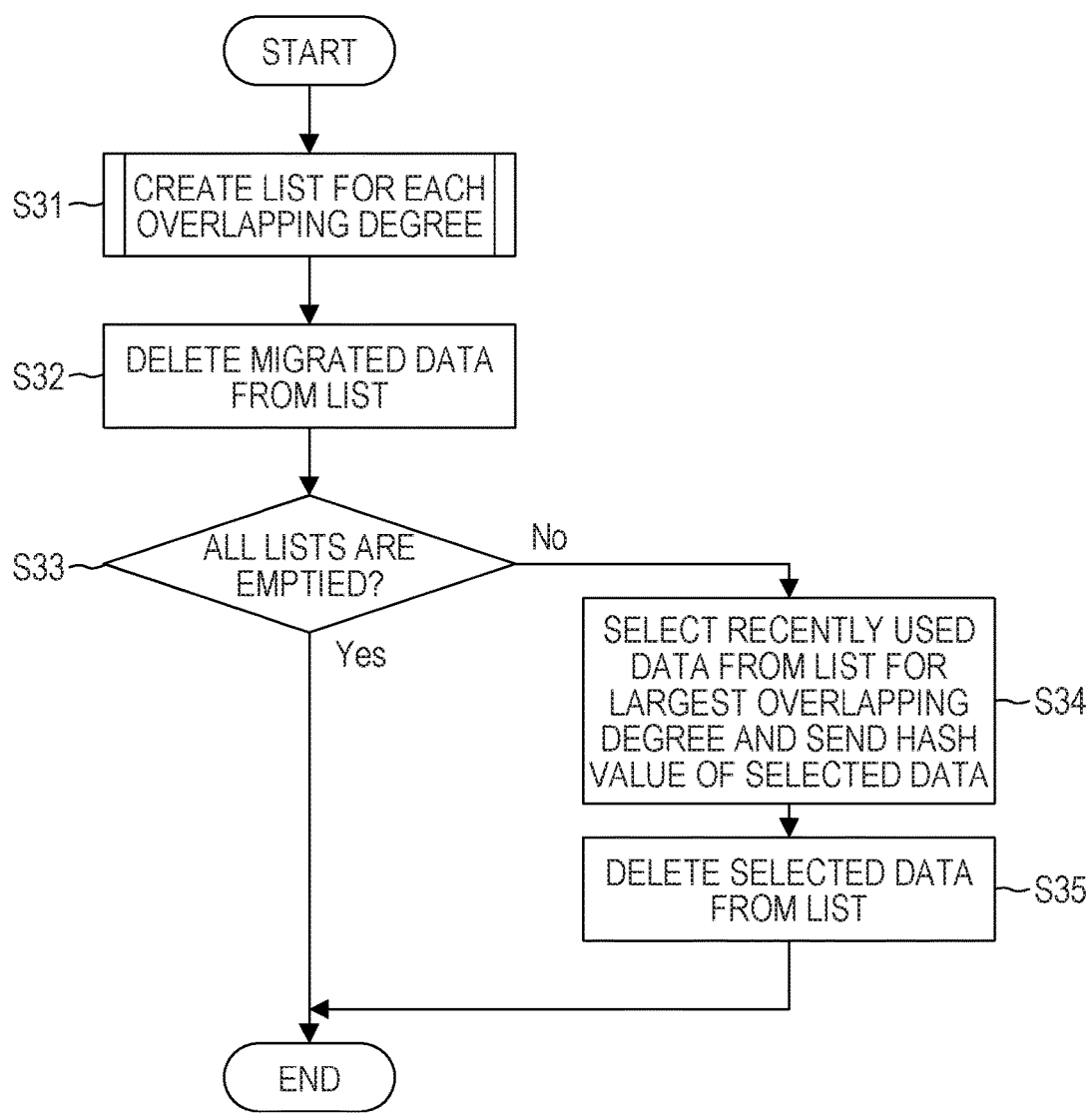
FIG. 14 is a flowchart illustrating processing of selecting data to transmit a hash value thereof in a storage system according to an embodiment.

Hereinafter, processing of selecting a hash value to be transmitted in the storage system according to the embodiment will be described with reference to FIG. 14.

Figure 11:
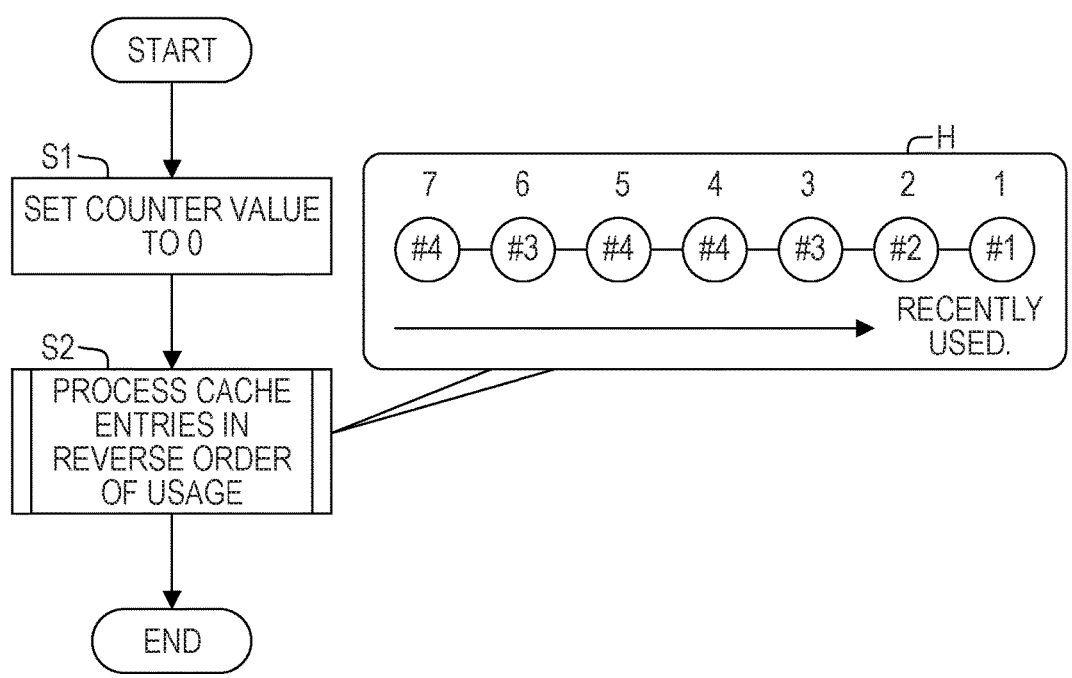
FIG. 11 is a flowchart illustrating a first example of LRU list creation processing in a storage system according to an embodiment.
Figure 12:
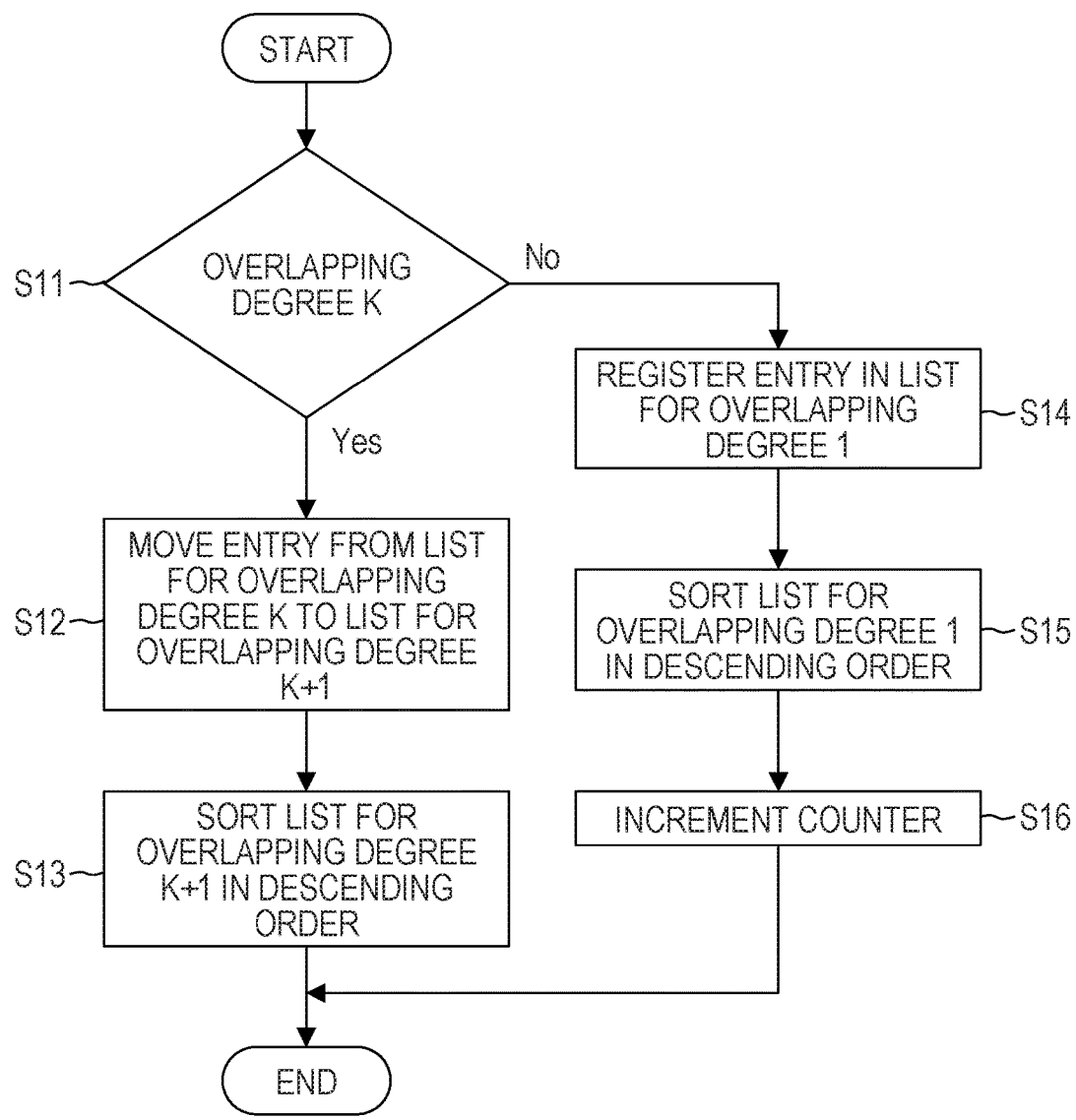
FIG. 12 is a flowchart illustrating details of a first example of LRU list creation processing in a storage system according to an embodiment.

The overlapping degree determination unit 114 and the order determination unit 115 execute the processing illustrated in FIG. 11 or FIG. 13 to create a LRU list for each overlapping degree (S31).

The hash value transmission unit 116 deletes, from the LRU list for each overlapping degree, data identified by a hash value that has already been transmitted to the migration origin storage device 2 (S32).

The hash value transmission unit 116 determines whether all LRU lists for the respective overlapping degrees are emptied (S33).

When all LRU lists for the respective overlapping degrees are emptied ("Yes" of S33), the processing is completed.

When data remains in an LRU list for any overlapping degree ("No" of S33), the hash value transmission unit 116 selects recently used data from an LRU list for a largest overlapping degree (S34). Then, the hash value transmission unit 116 sends a hash value of the selected data to the migration origin storage device 2.

The hash value transmission unit 116 deletes the selected data from the LRU list for each overlapping degree (S35), and the processing is completed.

As described above, the storage device 1 (storage system 100) according to the embodiment may achieve, for example, the following effects.

The overlapping degree determination unit 114 determines overlapping degrees of a plurality of data pieces stored in the cache area 64 of the memory 12. Then, the order determination unit 115 determines an order in which a plurality of hash values for identifying the respective data pieces are to be sent to the migration origin storage device 2, on the basis of the overlapping degrees determined by the overlapping degree determination unit 114.

Accordingly, a time required for data access in data migration between the storage devices 1 and 2 may be reduced. Specifically, since the migration destination storage device 1 sends the hash values of data to the migration origin storage device 2 in descending order of overlapping degrees, the data assumed to have a high data access frequency may be migrated to the migration destination storage device 1 in an earlier stage. An access amount from the host device to the migration origin storage device 2 may also be reduced.

When there is a plurality of data pieces having the same overlapping degree determined by the overlapping degree determination unit 114, the order determination unit 115 determines the order in which the plurality of hash values are to be sent to the migration origin storage device 2, on the basis of the reverse order of usage (usage results) of the plurality of data pieces having the same overlapping degree.

Accordingly, the data migration processing may be performed in a proper order even on the data pieces having the same overlapping degree.

The hash value determination unit 214 determines whether the hash values received by the hash value reception unit 213 are identical to hash values for identifying any of a plurality of data pieces stored in the migration origin storage device 2. Then, the migration processor 211 notifies of hash values determined to be identical by the hash value determination unit 214, among the plurality of hash values, to the migration destination storage device 1 so as to migrate data to the migration destination storage device 1.

Accordingly, a network load between the storage devices 1 and 2 may be reduced.

The hash value determination unit 214 determines whether the hash values are identical in the order in which the plurality of hash values are received by the hash value reception unit 213. The migration processor 211 performs the notification of hash values to the migration destination storage device 1 in the order in which the plurality of hash values are determined to be identical by the hash value determination unit 214.

Accordingly, the data migration processing may be performed in a proper order.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A migration destination storage device, comprising:
a memory device configured to
store therein a plurality of data pieces; and
a processor coupled to the memory device and the processor configured to
calculate a duplication number of identical data pieces among the plurality of data pieces stored in the memory device to determine an overlapping degree of each identical data of the plurality of data pieces stored in the memory device,
determine, according to the determined overlapping degree of each identical data, an order in which a plurality of information pieces for identifying each of the plurality of data pieces are to be sent to a migration origin storage device, and
send the plurality of information pieces for identifying each of the plurality of data pieces to the migration origin storage device in the determined order while excluding the plurality of data pieces.

2. The storage device according to claim 1, wherein
the processor is configured to
determine, when two or more data pieces have a same determined overlapping degree, the order for the two or more data pieces on basis of usage results of the two or more data pieces.

3. The storage device according to claim 1, wherein
the memory device is a cache memory in which the plurality of data pieces are temporarily stored.

4. A computer-readable recording medium having stored therein a program that causes a computer to execute a process, the process comprising:
calculating a duplication number of identical data pieces among a plurality of data pieces stored in a memory device;
determining an overlapping degree of each identical data of the plurality of data pieces stored in the memory device;
determining, according to the determined overlapping degree of each identical data degrees, an order in which a plurality of information pieces for identifying each of the plurality of data pieces are to be sent to a migration origin storage device, and sending the plurality of information pieces for identifying each of the plurality of data pieces to the migration origin storage device in the determined order while excluding the plurality of data pieces.

5. The computer-readable recording medium according to claim 4, the process comprising:

determining, when two or more data pieces have a same determined overlapping degree, the order for the two or more data pieces on basis of usage results of the two or more data pieces.

6. The computer-readable recording medium according to claim 4, wherein the memory device is a cache memory in which the plurality of data pieces are temporarily stored.

7. A storage system, comprising:

a first storage device including:

a first memory device configured to store therein a first plurality of data pieces, and a first processor configured to calculate a duplication number of identical data pieces among the first plurality of data pieces stored in the first memory device, determine an overlapping degree of each identical data of the first plurality of data pieces stored in the first memory device, determine, according to the determined overlapping degree of each identical data, an order in which a plurality of information pieces for identifying each of the plurality of data pieces are to be sent, and send the plurality of information pieces on basis of the determined order while excluding the plurality of data pieces; and a second storage device including:

a second memory device configured to store therein a second plurality of data pieces, and a second processor configured to receive the plurality of information pieces sent by the first processor, perform first determination of determining whether the received plurality of information pieces are identical to information pieces for identifying any of the second plurality of data pieces stored in the second memory device, and migrate first data pieces to the first storage device by performing first notification of notifying the first storage device of a first information pieces determined to be identical to information pieces for identifying any of the second plurality of data pieces stored in the second memory device, the first information pieces being for identifying the first data pieces.

8. The storage system according to claim 7, wherein the first processor is configured to determine, when two or more data pieces have a same determined overlapping degree, the order for the two or more data pieces on basis of usage results of the two or more data pieces.

9. The storage system according to claim 7, wherein the first memory device is a cache memory in which the first plurality of data pieces are temporarily stored.

10. The storage system according to claim 7, wherein the second processor is configured to perform the first determination in an order in which the plurality of information pieces are received, and perform the first notification in an order in which the first information pieces are determined to be identical.

* * * * *